United States Patent
Mun et al.

(10) Patent No.: US 12,321,281 B2
(45) Date of Patent: Jun. 3, 2025

(54) COMPUTER SYSTEM INCLUDING A MAIN MEMORY DEVICE WITH HETEROGENEOUS MEMORIES AND METHOD OF OPERATING THE SAME

(71) Applicant: SK hynix Inc., Gyeonggi-do (KR)

(72) Inventors: Yun Jeong Mun, Gyeonggi-do (KR); Rak Kie Kim, Gyeonggi-do (KR); Ho Kyoon Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/311,896

(22) Filed: May 4, 2023

(65) Prior Publication Data

US 2024/0160574 A1    May 16, 2024

(30) Foreign Application Priority Data

Nov. 11, 2022   (KR) .......................... 10-2022-0150725

(51) Int. Cl.
*G06F 12/0891* (2016.01)
(52) U.S. Cl.
CPC ................................ *G06F 12/0891* (2013.01)

(58) Field of Classification Search
CPC .................................................. G06F 12/0891
See application file for complete search history.

(56) References Cited

U.S. PATENT DOCUMENTS

2010/0153649 A1* 6/2010 Li ......................... G06F 12/084
   711/130
2010/0185816 A1   7/2010 Sauber et al.

FOREIGN PATENT DOCUMENTS

KR         10-2036769 B1      10/2019

* cited by examiner

*Primary Examiner* — Hosain T Alam
*Assistant Examiner* — Nicholas A. Paperno
(74) *Attorney, Agent, or Firm* — IP & T GROUP LLP (57) ABSTRACT

A computer system may include a processor; a first memory device; a second memory device; a cache memory including a plurality of cache entries and a cache controller. The cache controller is configured to manage a flag indicating whether a caching data is provided from the first memory device or the second memory device. The cache controller determines a cache entry to be evicted from the cache entries based on a cache miss ratio and a cache occupancy ratio.

9 Claims, 4 Drawing Sheets

COMPUTER SYSTEM INCLUDING A MAIN MEMORY DEVICE WITH HETEROGENEOUS MEMORIES AND METHOD OF OPERATING THE SAME

CROSS-REFERENCES TO RELATED APPLICATION

The present application claims priority under 35 U.S.C. § 119(a) to Korean patent application number 10-2022-0150725, filed on Nov. 11, 2022, which is incorporated herein by reference in its entirety.

BACKGROUND

1. Technical Field

Various embodiments of the present disclosure generally relate to a computer system, more particularly, to a computer system including a main memory device with heterogeneous memories and a method of operating the same.

2. Related Art

A computer system may include various memory devices. Each of the memory devices may include a memory configured to store data and a memory controller configured to control an operation of the memory. The memory may be classified into a volatile memory such as a dynamic random access memory (DRAM), a static random access memory (SRAM), etc., and a non-volatile memory such as an electrically erasable programmable ROM (EEPROM), a ferroelectric RAM (FRAM), a phase change random access memory (PCRAM), a magnetic RAM (MRAM), a flash memory, etc. Recently, a main memory device including heterogeneous memories combining the volatile memory and the non-volatile memory have been developed.

In order to reduce a bottle neck caused by a speed difference between a processor and the main memory device, the computer system may use a cache memory. Because the volatile memory and the non-volatile memory may have different operation speeds, it may be required to determine data cached in the cache memory in consideration of the operation speeds of the heterogeneous memories in the main memory device.

SUMMARY

According to example embodiments, there may be provided a computer system including heterogeneous memories. The computer system may include a processor; a first memory device; a second memory device having access latency different from access latency of the first memory device; a cache memory including a plurality of cache entries, configured to store caching data provided from the first memory device or the second memory device in the cache entries; and a cache controller configured to manage a source indicating whether the caching data is provided from the first memory device or the second memory device, and determine a cache entry to be evicted from the cache entries based on a cache miss ratio of request data by the source which the request data is read when the request data of the processor do not exist in the cache memory and a cache occupancy ratio by the source.

According to example embodiments, there may be provided a computer system including heterogeneous memories. The computer system may include a main memory device including a first memory device and a second memory device heterogeneous from the first memory device; a cache memory including a plurality of cache entries, configured to store caching data provided from the main memory device and a source indicating whether the caching data in the cache entries is provided from the first memory device or the second memory device, and to output request data corresponding to a data access request; and a cache controller configured to compare a cache occupancy ratio of the caching data by the source with a miss number by the source which is the number of times the request data which do not exist in the cache memory, read from the first memory device or the second memory device, and determine a cache entry to evict storing the caching data provided from the main memory device in which the miss number is less than the cache occupancy ratio from the cache memory.

According to example embodiments, there may be provided a method of operating a computer system including a main memory device with heterogeneous memories. In the method of operating the computer system including storing, by the cache controller, storing, by the cache controller, caching data which are provided from a first memory device or a second memory device heterogeneous from the first memory device, and a source indicating whether the caching data is provided from the first memory device or the second memory device in at least one of a plurality of cache entries; reading request data from the first memory device or the second memory device when the request data of a processor do not exist in the cache memory; and when an empty cache entry for caching the read data does not exist, determining a cache entry to be evicted based on a cache miss ratio of request data by the source which the request data is read and a cache occupancy ratio by the source.

According to example embodiments, there may be provided a method for operating a system, which includes heterogeneous first and second memory devices, and a cache memory including a plurality of cache entries, the method comprising: determining whether request data corresponding to a data access request is stored in the cache memory; when it is determined that the request data is not stored in the cache memory, determining whether there is an empty cache entry of the plurality of cache entries; when it is determined that there is no empty cache entry, determining a sacrificial cache entry to be evicted from the plurality of cache entries based on a cache miss ratio and an occupancy ratio of the cache memory for each of the first and second memory devices; and caching, in the sacrificial cache entry, the request data from a corresponding memory device of the first and second memory devices. The method further comprising: updating the cache miss ratio and the occupancy ratio of the cache memory for each of the first and second memory devices.

BRIEF DESCRIPTION OF THE DRAWINGS

The above and other aspects, features and advantages of the subject matter of the present disclosure will be more clearly understood from the following detailed description taken in conjunction with the accompanying drawings, in which.

DETAILED DESCRIPTION

Hereinafter, example embodiments may be described in detail with reference to the accompanying drawings.

Figure 1:
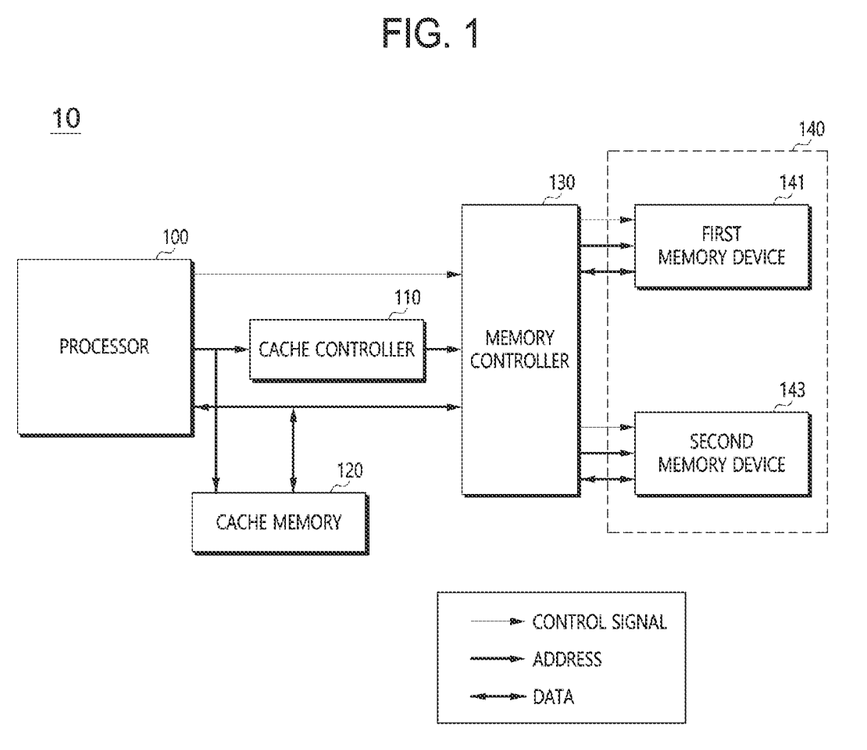
FIG. 1 is a view illustrating a computer system including a main memory device with heterogeneous memories in accordance with example embodiments of the present disclosure.

FIG. 1 is a view illustrating a computer system including a main memory device with heterogeneous memories in accordance with example embodiments of the present disclosure.

Referring to FIG. 1, a computer system 10 of example embodiments may include a processor 100, a cache controller 110, a cache memory 120, a memory controller 130 and a main memory device 140, which are electrically connected with each other through a system bus. Although not depicted in drawings, an additional cache memory may be arranged in the processor 100.

The processor 100 may be available for commercial ends. The processor 100 may include dual micro-processor, a multi-core processor, a multi-process architecture, etc.

The processor 100 may be accessed by the cache memory 120 through the cache controller 110. The processor 100 may be accessed by the main memory device 140 through the memory controller 130. For example, the processor 100 may process or perform programs and/or data stored in the main memory device 140 in response to a clock signal. In an embodiment, the clock signal may be outputted from a clock signal generator.

The main memory device 140 may include a first memory device 141 and a second memory device 143. The first memory device 141 and the second memory device 143 may include heterogeneous memories having different structures and different latencies. For example, the first memory device 141 may include a volatile memory VM, whereas the second memory device 143 may include a non-volatile memory NVM. The volatile memory may include a DRAM, but it not limited thereto. The non-volatile memory may include a PCRAM, but is not limited thereto.

The memory controller 130 may control the main memory device 140 to perform an operation corresponding to a command received from the processor 100. The main memory device 140 may write data to or read data from a memory cell array in accordance with the command provided from the memory controller 130. In example embodiments, the memory controller 130 may store frequently accessed data by the processor 100, for example, hot data in the first memory device 141. The memory controller 130 may store infrequently accessed data by the processor 100, for example, cold data in the second memory device 143.

The cache memory 120 may include a widely used memory for reducing a bottle neck caused by a speed difference between devices. That is, the cache memory 120 may buffer a data bottle neck is between the processor 100 having a relatively fast operation speed and the main memory device 140 having a relatively slow operation speed. The cache memory 120 may cache frequency accessed data by the processor 100 among the data in the main memory device 140.

Although not depicted in drawings, the cache memory 120 may include caches in a plurality of levels in accordance with an operation speed and a physical distance from the processor 100. Generally, a first level L1 of a cache may be built in the processor 100 to be used first for data reference and use. The L1 cache may have the highest speed. In contrast, the L1 cache may have a low storage capacity. When data does not exist in the L1 cache, for example, a cache miss, the processor 100 may access a second level L2 of a cache. The L2 cache may have a speed slower than the speed of the L1 cache. In contrast, the L2 cache may have a storage capacity greater than the storage capacity of the L1 cache. When data does not exist in the L2 cache, the processor 100 may access a down-ranked level of a cache. When data does not exist in a last level cache LLC, the processor 100 may then access the main memory device 140.

When the cache memory 120 includes the multi-level, the LLC may cache data provided from the main memory device 140. Up-ranked level caches of the LLC may cache data provided from a next down-ranked level cache, but is not limited thereto.

The cache controller 110 may control total operations of the cache memory 120. That is, the cache controller 110 may include an internal algorithm and hardware for processing the algorithm for is determining whether any one among the data in the main memory device 140 may be stored in the cache memory 120, any one among the data in the cache memory may be exchanged when the cache memory 120 may be fully filled with the data, and the data requested from the processor 100 may exist in the cache memory 120. The cache controller 120 may use a mapping table for representing a relation between the cached data and data stored in the main memory device 140.

In example embodiments, the cache controller 110 may manage a source of the data cached in the cache memory 120 corresponding to the first memory device 141 or the second memory device 143.

Figure 2:
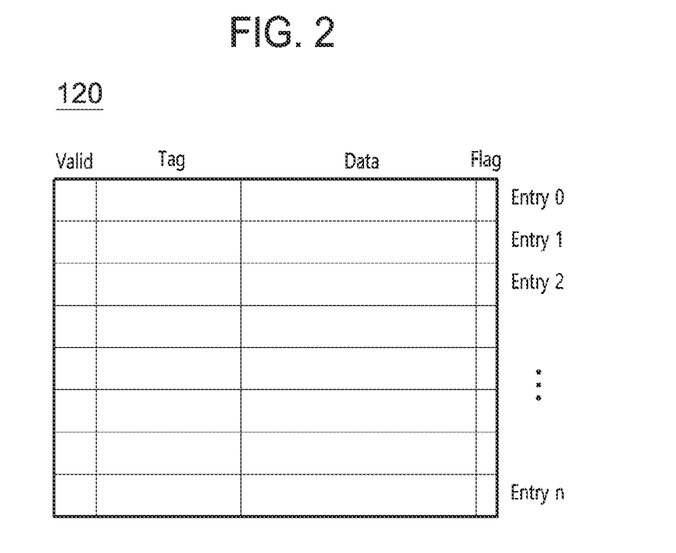
FIG. 2 is a view illustrating a cache entry in accordance with example embodiments of the present disclosure.

FIG. 2 is a view illustrating a cache entry in accordance with example embodiments of the present disclosure.

Referring to FIG. 2, the cache memory 120 of example embodiments may be classified into a plurality of cache entries Entry 0 to Entry n. Each of the cache entries may include a valid bit Valid, a tag bit Tag, a data block Data and a flag bit Flag.

The valid bit Valid may be referenced for determining whether a valid block may be stored in the data block Data of a corresponding cache entry.

The tag bit Tag may represent an actual address of data stored in a corresponding cache entry, i.e., information corresponding to a physical address in the main memory device 140.

The data received from the main memory device 140 may be is cached in the data block Data.

The flag bit Flag may represent a source of data stored in the data block Data, i.e., information indicating that the caching data may be provided from the first memory device 141 or the second memory device 143.

The data request of the processor 100 may include an access address. The cache controller 110 may compare the access address with the tag bit Tag to determine whether the request data may exist in the cache memory 120 or not.

When the request data does exist in the cache memory 120, i.e., a cache hit, the request data may be provided from the cache memory 120 to the processor 100.

In contrast, when the request data does not exist in the cache memory 120, i.e., a cache miss, the cache controller 110 may count a miss number in accordance with a kind of the main memory device 140 in which the request data may be stored. The cache controller 110 may then transmit the data request to the memory controller 130. The memory controller 130 may read the data from the first memory device 141 or the second memory device 143 in accordance with the access address in the data request. The memory controller 130 may then provide the read data to the cache memory 120.

When empty cache entries exist in the cache memory 120, the cache controller 110 may cache the data provided from the first memory device 141 or the second memory device 143 in at least one of the empty cache entries. The cache controller 110 may set the flag bit Flag in accordance with a source of the caching data. In contrast, when an empty cache entry does not exist in the cache memory 120, the cache controller 110 may perform a cache exchange operation. In an embodiment, the cache exchange operation may include determining a sacrificial cache entry, storing the request data in the sacrificial cache entry, and setting the flag bit Flag.

In order to determine the sacrificial cache entry, the cache controller 110 may refer to a cache miss ratio by a source and/or a cache occupancy ratio by a source. The cache miss ratio may correspond to a read number of the request data by the cache miss read from the first memory device 141 or the second memory device 143. The cache occupancy ratio may represent a ratio of the caching data by a source.

When the request data of the processor 100 by the cache miss may be read from the main memory device 140, the cache controller 110 may calculate the cache miss ratio by the source based on a first miss number of the data as the cache miss read from the first memory device 141 and a second miss number of the data as the cache miss read from the second memory device 143.

For example, the first miss number, which may correspond to a number of the request data as the cache miss read from the first memory device 141, may be 10. For example, the second miss number corresponding to a number of the request data read from the second memory device 143 may be 20. The cache miss ratio of the request data by the source corresponding to the first memory device 141 may is be 10/20=½ based on the first and second miss numbers. Alternatively, the cache miss ratio of the request data by the source corresponding to the first memory device 141 may be 10/30=⅓ based on the first miss number and a total miss number (i.e., the first miss number+the second miss number=30).

Because the flag bit Flag for representing the sources of the caching data may be assigned to the cache entries Entry 0 to Entry n, the cache controller 110 may calculate the cache occupancy ratio of the caching data by the source stored in the cache memory 120. For example, the data may be cached in the seven cache entries. The data provided from the first memory device 141 may be cached in the five cache entries among the seven cache entries. The data provided from the second memory device 143 may be cached in the remaining two cache entries. The occupancy ratio of the caching data by the source corresponding to the first memory device 141 may be 5/2=2.5 based on the numbers of the caching data by the source corresponding to the second memory device 143. Alternatively, the occupancy ratio of the caching data by the source corresponding to the first memory device 141 may be 5/(n+1) based on numbers (n+1) of the total cache entries.

When the cache miss ratio of the request data by the source corresponding to the first memory device 141 (for example, ½) may be less than the cache occupancy ratio of the caching data by the source corresponding to the first memory device 141 (for example, 5/2), the cache controller 110 may determine that the cache miss with respect to the cache occupancy ratio of the data by the source as the first memory device 141 may be relatively less generated. That is, the cache controller 110 may determine that the cache miss of the data by the source as the second memory device 143 may be relatively more generated. The cache controller 110 may select any one of the cache entries by the source corresponding to the first memory device 141 as the sacrificial cache entry. In some embodiments, the sacrificial cache entry may be selected by a least recently used (LRU) way, a random way, a first in first out (FIFO) way, a least frequency used (LFU) way, etc.

When the cache miss ratio with respect to the data in the first memory device 141 may be greater than the cache occupancy ratio with respect to the data in the first memory device 141, the miss ratio with respect to the data in the first memory device 141 may be determined to be high so that the caching data by the source as the second memory device 143 may be evicted from the cache memory 120.

When the cache miss ratio and the cache occupancy ratio with respect to the first memory device 141 may be equal to each other, the sacrificial cache entry may be determined regardless of the source of the caching data.

Figure 3:
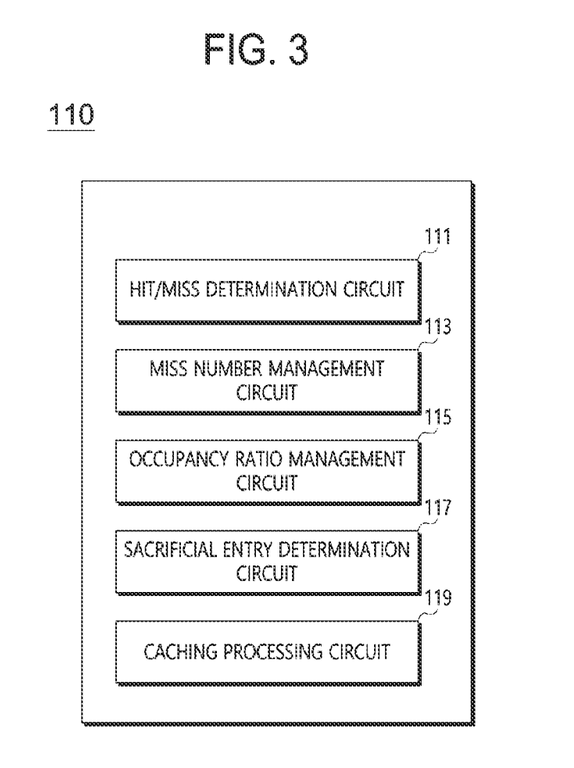
FIG. 3 is a view illustrating a cache controller in accordance with example embodiments of the present disclosure.

FIG. 3 is a view illustrating a cache controller in accordance with example embodiments of the present disclosure.

Referring to FIG. 3, the cache controller 110 may include a hit/miss determination circuit 111, a miss number management circuit 113, an occupancy ratio management circuit 115, a sacrificial entry determination circuit 117 and a caching processing circuit 119.

The hit/miss determination circuit 111 may compare the access address in the data request of the processor 100 with the tag bit of the cache entry to determine whether the request data may exist in the cache memory 120 or not. When the request data exists in the cache memory 120, the hit/miss determination circuit 111 may output a cache hit signal. In contrast, when the request data does not exist in the cache memory 120, the hit/miss determination circuit 111 may transmit the data request to the memory controller 130.

The miss number management circuit 113 may count the miss number in accordance with a type of the main memory device 140 in which the request data may be stored to calculate the cache miss ratio by the source. The cache miss ratio by the source may be determined as a number of the request data read from the first memory device 141 with respect to a number of the request data read from the second memory device 143 by the cache miss or an inverse number of the number, or a number of the request data with respect a total cache miss number read from the first memory device 141 or the second memory device 143.

The occupancy ratio management circuit 115 may calculate the cache occupancy ratio of the caching data by the source stored in the cache memory 120. The cache occupancy ratio by the source may be determined as a ratio of the caching data by the source as the first memory device 141 with respect to the caching data by the source as the second memory device 143 or an inverse number of the ratio, or a ratio of the caching data with respect to the total caching data by the source as the first memory device 141 or the second memory device 143.

When the empty cache entry for storing the data read from the main memory device 140 by the cache miss does not exist, the sacrificial entry determination circuit 117 may determine the cache entry to be evicted. In order to determine the sacrificial cache entry, the sacrificial entry determination circuit 117 may refer to the cache miss ratio by the source and the cache occupancy ratio by the source.

In example embodiments, when the cache miss ratio of the request data by the source corresponding to the first memory device 141 may be less than the cache occupancy ratio of the caching data by the source corresponding to the first memory device 141, the cache controller 110 may determine that the cache miss with respect to the cache occupancy ratio of the data by the source as the first memory device 141 may be relatively less generated. That is, the cache controller 110 may determine that the cache miss of the data by the source as the second memory device 143 may be relatively more generated. Thus, the sacrificial entry determination circuit 117 may determine that the caching data by the source as the first memory device 141 may be evicted from the cache memory 120. The cache controller 110 may select one of the cache entries by the source corresponding to the first memory device 141 as the sacrificial cache entry. In some embodiments, the sacrificial cache entry may be selected by a least recently used (LRU) way, a random way, a first in is first out (FIFO) way, a least frequency used (LFU) way, etc.

The caching processing circuit 119 may cache the data provided from the main memory device 140 in the empty cache entry or the sacrificial cache entry of the cache memory 120. The caching processing circuit 119 may set the flat bit Flag in accordance with the source of the caching data.

Figure 4:
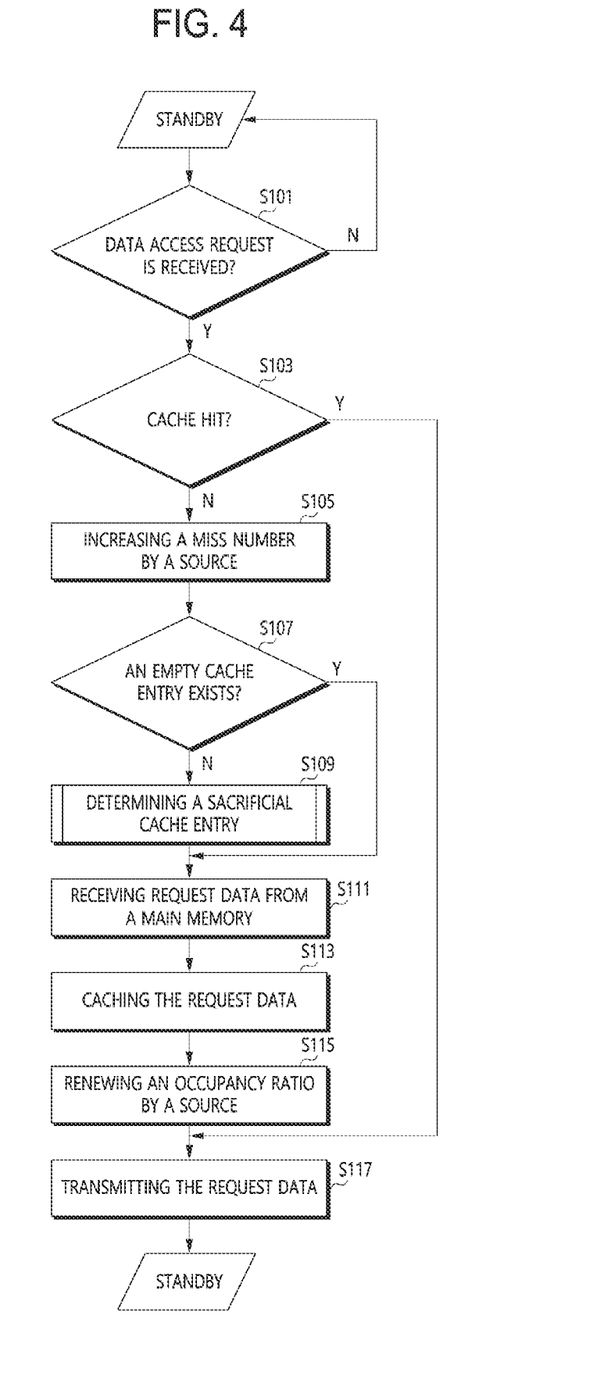
FIG. 4 is a flowchart illustrating a method of operating a computer system in accordance with example embodiments of the present disclosure.

FIG. 4 is a flowchart illustrating a method of operating a computer system in accordance with example embodiments of the present disclosure. In some embodiments, the method of FIG. 4 may be performed by the computer system 10 of FIGS. 1-3.

Referring to FIG. 4, at S101, the cache controller 110 may check whether the data access request may be received from the processor 100 or not in a standby mode. When the data access request is not received (S101:N), the cache controller 110 may maintain the standby mode.

When the data access request is received (S101:Y), at S103, the cache controller 110 may check whether the data corresponding to the data access request of the processor 100 exists in the cache memory 120, i.e., the cache hit. For example, the cache controller 110 may compare the access address in the data access request with the tag bit of the cache entry to determine whether the request data exists in the cache memory 120 or not.

When the request data exists in the cache memory 120, i.e., the cache hit (S103:Y), the cache controller 110 may read the request data from the cache memory 120. At S117, the cache controller 110 may then transmit the read data to the processor 100.

When the request data does not exist in the cache memory 120, i.e., the cache miss (S103:N), at S105, the cache controller 110 may count (or increase) the miss number in accordance with the type of the main memory device 140 in which the request data may be stored. At S107, the cache controller 110 may check whether the empty cache entry for caching the read data from the main memory device 140 exists or not in accordance with the cache miss.

When the empty cache entry does not exist (S107:N), at S109, the cache controller 110 may determine the sacrificial cache entry for storing the request data. In order to determine the sacrificial cache entry, the cache controller 110 may refer to the cache miss ratio by the source and the cache occupancy ratio by the source.

When the sacrificial cache entry may be determined (S109) or it is determined that the empty cache entry exists (S107:Y), at S111, the cache controller 110 may receive the request data from the main memory device 140. At S113, the cache controller 110 may cache the received request data in the sacrificial cache entry or the empty cache entry. The cache controller 110 may set the flag bit Flag in accordance with the source of the caching data.

By storing new data in the cache entry, at S115, the cache controller 110 may renew the cache occupancy ratio by the source. At S117, the cache controller 110 may transmit the request data to the processor 100. The cache controller 110 may be in the standby mode.

Figure 5:
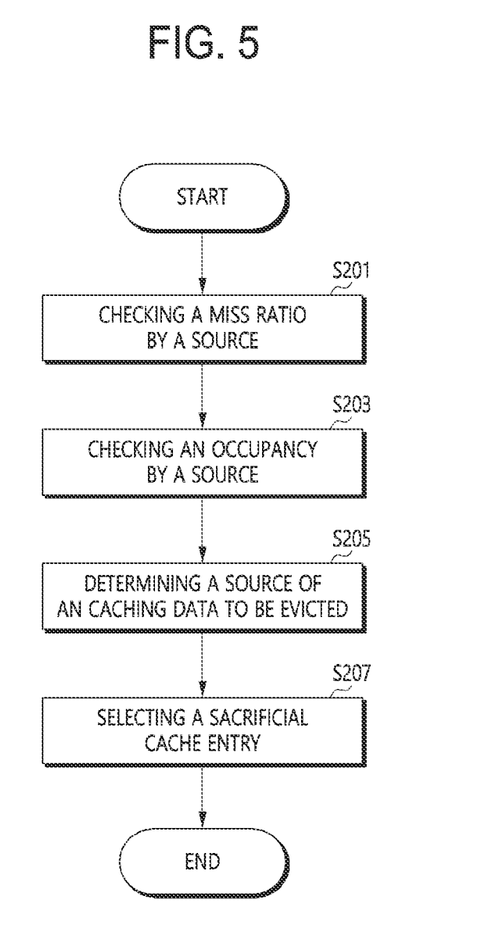
FIG. 5 is a flowchart illustrating a method of operating a computer system in accordance with example embodiments of the present disclosure.

FIG. 5 is a flowchart illustrating a method of operating a is computer system in accordance with example embodiments of the present disclosure. FIG. 5 may show an example of operation S109 for determining the sacrificial cache entry in FIG. 4.

Referring to FIG. 5, at S201, the cache controller 110 may determine the cache miss ratio by the source. In an embodiment, the cache miss ratio may be determined by the number of the request data read from the first memory device with respect to the number of the request data read from the second memory device 143 by the cache miss or the inverse number, or the number of the request data read from the first memory device 141 or the second memory device 143 with respect to the total cache miss number.

At S203, the cache controller 110 may determine the cache occupancy ratio of the caching data by the source in the cache memory 120. In an embodiment, the cache occupancy ratio by the source may be determined by the ratio of the caching data from the source as the first memory device 141 with respect to the caching data from the source as the second memory device 143 or the inverse number, or the ratio of the caching data from the source as the first memory device 141 or the second memory device 143 with respect to the total caching data.

At 205, the cache controller 110 may determine the source of the cache entry to be evicted based on the cache miss ratio by the source and the cache occupancy ratio by the source. In example embodiments, the cache controller 110 may compare the cache miss ratio by the source with the cache occupancy ratio by the source to is determine the source of the cache entry to be evicted.

For example, when the cache miss ratio of the request data by the source corresponding to the first memory device 141 may be less than the cache occupancy ratio of the caching data by the source corresponding to the first memory device 141, the cache controller 110 may determine that the cache miss with respect to the cache occupancy ratio of the data by the source as the first memory device 141 may be relatively less generated. That is, the cache controller 110 may determine that the cache miss of the data by the source as the second memory device 143 may be relatively more generated. Thus, the cache controller 110 may determine that the caching data by the source as the first memory device 141 may be evicted from the cache memory 120.

When the source of the cache entry to be evicted may be determined, at S207, the cache controller 110 may select one of the cache entries by the source corresponding to the first memory device 141 as the sacrificial cache entry. In some embodiments, the sacrificial cache entry may be selected by a least recently used (LRU) way, a random way, a first in first out (FIFO) way, a least frequency used (LFU) way, etc. For example, a cache entry to which the data cached in the cache memory 120 not accessed for a long time may be selected as the sacrificial cache entry.

According to example embodiments, the data cached in the cache memory may be effectively selected from the main memory device including the heterogeneous memories so that the cache occupancy ratio of the data in the main memory device in which the cache miss may be frequently generated may be increased to increase the cache hit ratio, thereby improving a performance of the computer system.

The above described embodiments of the present invention are intended to illustrate and not to limit the present invention. Various alternatives and equivalents are possible. The invention is not limited by the embodiments described herein. Nor is the invention limited to any specific type of semiconductor device. Any additions, subtractions, or modifications which are apparent in view of the present disclosure are intended to fall within the scope of the appended claims. Furthermore, the embodiments may be combined to form additional embodiments.

What is claimed is:

1. A computer system comprising:
   a processor;
   a first memory device;
   a second memory device having access latency different from access latency of the first memory device;
   a cache memory including a plurality of cache entries, configured to store caching data provided from the first memory device or the second memory device in the cache entries; and
   a cache controller configured to manage a flag indicating whether the caching data is provided from the first memory device or the second memory device, and determine a cache entry to be evicted from the cache entries based on a cache miss ratio of request data and a cache occupancy ratio, and
   wherein the cache miss ratio comprises a first cache miss ratio, which is a ratio of a first number of misses in which the request data is read from the first memory device to a total number of cache misses, and a second cache miss ratio, which is a ratio of a second number of misses in which the request data is read from the second memory device to the total number of cache misses,
   the cache occupancy ratio comprises a first cache occupancy ratio, which is a ratio of a number of a first caching data provided from the first memory device to a total number of the cache entries, and a second cache occupancy ratio, which is a ratio of a number of a second caching data provided from the second memory device to a total number of the cache entries, and
   the cache controller is configured to determine the cache entry to be evicted based on the first cache miss ratio and the first cache occupancy ratio to the first memory device or the second cache miss ratio and the second cache occupancy ratio to the second memory device.

2. The computer system of claim 1, wherein the cache controller evicts at least one of the cache entries storing the caching data provided from the first memory device when the first cache miss ratio is less than the first cache occupancy ratio.

3. The computer system of claim 1, wherein the cache controller evicts at least one of the cache entries regardless of the type of memory device when the first cache miss ratio and the first cache occupancy ratio are equal to each other, or the second cache miss ratio and the second cache occupancy ratio are equal to each other.

4. A computer system comprising:
   a main memory device including a first memory device and a second memory device heterogeneous from the first memory device;
   a cache memory including a plurality of cache entries, configured to store caching data provided from the main memory device and a flag indicating whether the caching data in the cache entries is provided from the first memory device or the second memory device, and to output request data corresponding to a data access request; and
   a cache controller configured to compare a cache occupancy ratio of the caching data with a number of misses, and determine a cache entry to evict storing the caching data provided from the main memory device in which the number of misses is less than the cache occupancy ratio from the cache memory,
   wherein the cache occupancy ratio comprises a first cache occupancy ratio, which is a ratio of a number of a first caching data provided from the first memory device to a total number of the cache entries, and a second cache occupancy ratio, which is a ratio of a number of a second caching data provided from the second memory device to a total number of the cache entries, and
   the number of misses comprises a first number of misses in which the request data is read from the first memory device, and a second number of misses in which the request data is read from the second memory device.

5. The computer system of claim 4, wherein the cache memory has multi-levels.

6. The computer system of claim 4, wherein the first memory device and the second memory device have different access latencies.

7. A method of operating a computer system including a cache controller configured to control a cache memory, the method comprising:
   storing, by the cache controller, caching data which are provided from a first memory device or a second memory device heterogeneous from the first memory device, and a flag indicating whether the caching data is provided from the first memory device or the second memory device in at least one of a plurality of cache entries;
   reading request data from the first memory device or the second memory device when the request data of a processor does not exist in the cache memory; and
   when an empty cache entry for caching the read data does not exist, determining a cache entry to be evicted based on a cache miss ratio of request data and a cache occupancy ratio, and
   wherein the cache miss ratio comprises a first cache miss ratio, which is a ratio of a first number of misses in which the request data is read from the first memory device to a total number of cache misses, and a second cache miss ratio, which is a ratio of a second number of misses in which the request data is from the second memory device to the total number of cache misses,
   the cache occupancy ratio comprises a first cache occupancy ratio, which is a ratio of a number of a first caching data provided from the first memory device to a total number of the cache entries, and a second cache occupancy ratio, which is a ratio of a number of a second caching data provided from the second memory device to a total number of the cache entries, and
   determining the cache entry to be evicted comprises determining based on the first cache miss ratio and the first cache occupancy ratio to the first memory device or the second cache miss ratio and the second cache occupancy ratio to the second memory device.

8. The method of claim 7, wherein determining the cache entry to be evicted comprises evicting at least one of the cache entries storing the caching data provided from the first memory device when the first cache miss ratio is less than the first cache occupancy ratio.

9. The method of claim 7, wherein determining the cache entry to be evicted comprises evicting at least one of the cache entries irrelevant regardless of the type of memory device when the first cache miss ratio and the first cache occupancy ratio are equal to each other, or the second cache miss ratio and the second cache occupancy ratio are equal to each other.

* * * * *